United States Patent

[11] 3,618,517

| [72] | Inventor | Davies Allport<br>La Jolla, Calif. |
|---|---|---|
| [21] | Appl. No. | 1,631 |
| [22] | Filed | Jan. 9, 1970 |
| [45] | Patented | Nov. 9, 1971 |
| [73] | Assignee | Cubic Corporation<br>San Diego, Calif. |

[54] CREDIT CARD VERIFICATION APPARATUS AND SYSTEM
4 Claims, 4 Drawing Figs.

[52] U.S. Cl. .................................................. 101/269,
235/61.7, 340/149 A, 235/61.11
[51] Int. Cl. ..................................................... B41f 3/04,
G06k 7/02, H04q 3/70
[50] Field of Search............................................. 101/269,
282, 283, 284, 285, 93, 1; 235/201, 61.7, 61.11;
340/149.5, 149

[56] References Cited
UNITED STATES PATENTS

| 3,302,004 | 1/1967 | Eckert et al. ................ | 235/61.7 |
|---|---|---|---|
| 3,447,457 | 6/1969 | Dechert et al. ............... | 101/269 |
| 3,343,481 | 9/1967 | Giannuzzi et al. ............ | 101/93 C |
| 2,891,721 | 6/1959 | Chenus......................... | 340/149 A |
| 3,239,142 | 3/1966 | Levine.......................... | 235/201 |
| 3,366,043 | 1/1968 | Fitch ............................ | 101/93 C |
| 3,427,962 | 2/1969 | Giannuzzi...................... | 101/93 C |

OTHER REFERENCES
IBM Technical Disclosure Bulletin, Vol. 8, No. 9, Feb., 1966

*Primary Examiner*—William B. Penn
*Attorney*—Jessup and Beecher

ABSTRACT: A credit card verification system is provided whereby credit cards may be quickly checked at their point of use to determine whether a particular card is valid, or whether it has been invalidated because of loss, for example, or because of nonpayment; and also which may be checked to determine whether or not the term for which a card was issued has expired. The verification apparatus and system to be described is one in which the expiration date of the card is checked by pneumatic means, in a simple adjustable unit which may, for example, be attached directly to the card imprinter at the point of use; and in which a serial number coded on the card by means, for example, of embossments, is read, likewise by pneumatic means, and the resulting signals are compared in an electronic system with signals stored in the system and which are indicative of the invalid cards. The electronic system may be located at the point of use of the cards, or at a central station.

INVENTOR:
Davies Allport

Jenney and Becker

By Keith D. Becker

ATTORNEYS

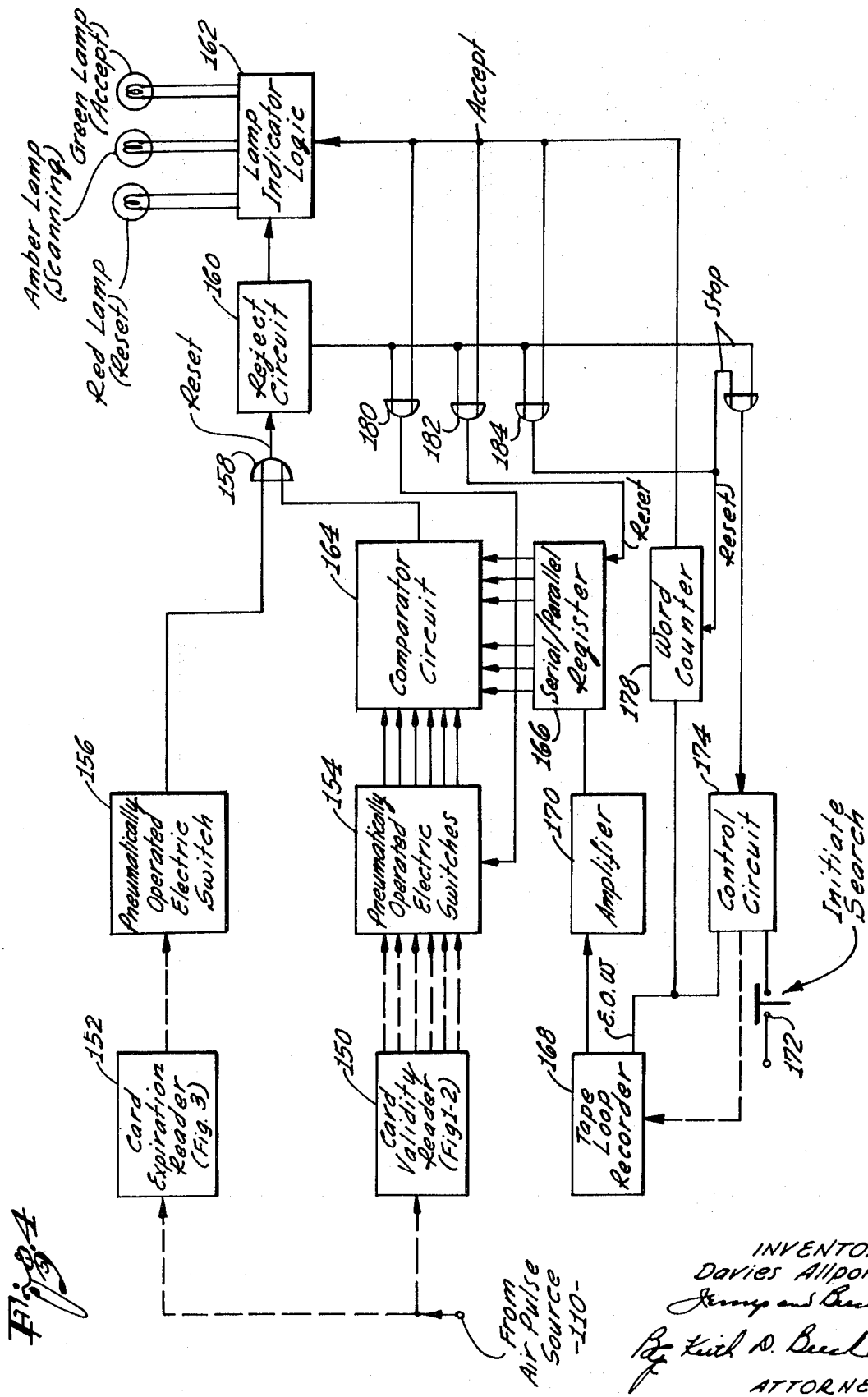

CREDIT CARD VERIFICATION APPARATUS AND SYSTEM

BACKGROUND OF THE INVENTION

As is well known, credit cards have become a dominant force in the present day economy. Such cards are in general use on a citywide, statewide and nationwide basis. Credit cards are used, for example, in gasoline service stations, car rental agencies, restaurants, airlines, department stores, hotels, and so on.

A problem which is becoming more serious year by year is the continued use of credit cards which have been invalidated, either because of loss or nonpayment of the account. It is the usual practice for the companies issuing the credit cards to send out lists of the invalid cards to the places at which the cards are used. However, these lists are usually so voluminous that it is not feasible for the employees to check the number of each credit card present against all the numbers on the list. It is also a usual practice for the credit card companies to have an expiration date shown on the credit card. However, again, it is difficult for the employees accepting the card to check carefully each card to see whether or not the expiration date has passed.

The verification system of the present invention provides a simple and inexpensive means whereby, when a card is presented at a point of use, such as a gasoline service station, restaurant or the like, its expiration date may be checked quickly and accurately on a completely economical basis, to determine whether or not the card has expired, and whereby its serial number may be checked electronically in a matter of seconds against an updated file of all invalid credit cards, so that the card may be accepted only if its number does not appear in the file, and only if it has not expired.

In the practice of the invention, and as will be described in detail herein, the serial numbers of the invalid credit cards are recorded on a tape loop, and the tape loop is sensed, either at a central point or at each point of use, by appropriate equipment, so that the sensed serial number of the card being processed may be checked quickly and accurately against all the numbers recorded in the magnetic file. If the magnetic file is located at a central station, the information sensed at the point of use may be quickly and easily communicated to the central station by known telemetry means, and the "reject" or "accept" signal returned to the point of use by similar telemetry communication means.

Pneumatic sensing techniques may be used in the apparatus and system of the present invention. For example, a card sensor may be used in conjunction with a credit card imprinter at the point of use, and which includes pneumatic means operating in conjunction with embossments on the card to provide signals representative of the serial number of the card, such as described in copending application Ser. No. 758,214 which was filed Sept. 9, 1968 in the name of the present inventor and entitled "Identification Unit".

BRIEF DESCRIPTION OF THE DRAWINGS

FIG. 4 is a block diagram of a suitable electrical control signal for responding to pneumatic signals from the sensors of FIGS. 1–3, and for producing indications as to whether a particular credit card should be accepted or rejected.

DETAILED DESCRIPTION OF THE ILLUSTRATED EMBODIMENTS

Figure 1:
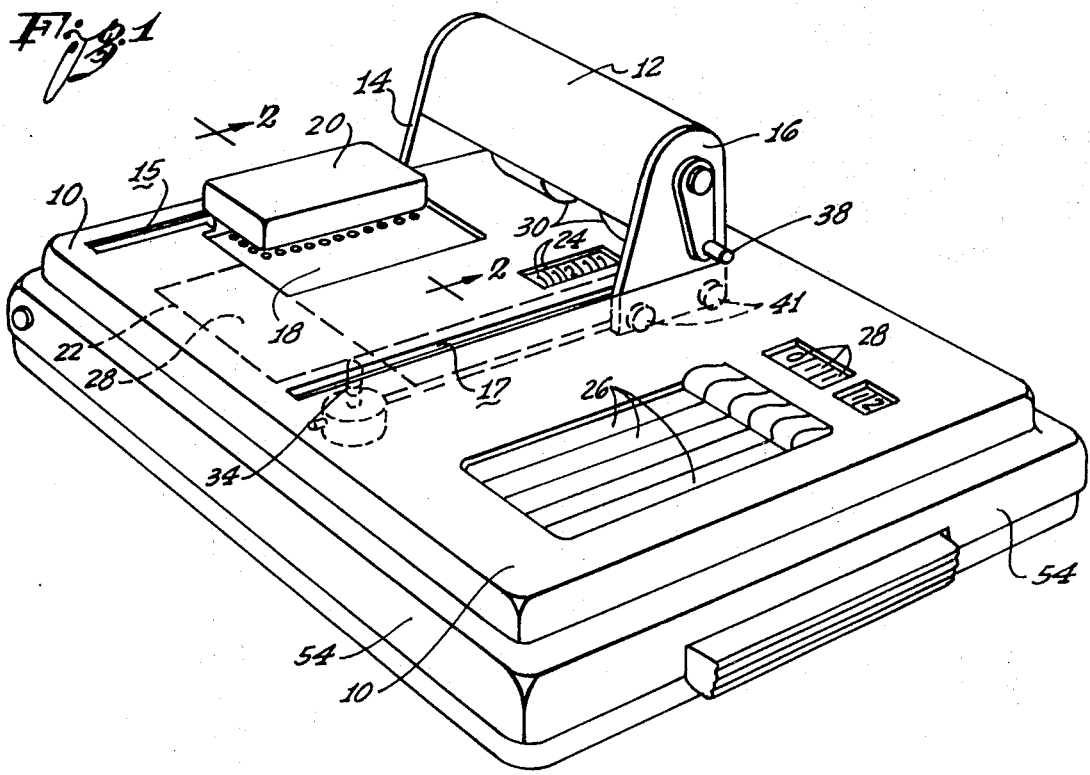
FIG. 1 is a perspective view of a credit card imprinter unit, such as disclosed in the aforesaid copending application, and which has been constructed to incorporate a pneumatic sensor for sensing embossments on a credit card placed in the unit, for producing fluidic signals representative of the serial number of the particular credit card.
Figure 2:
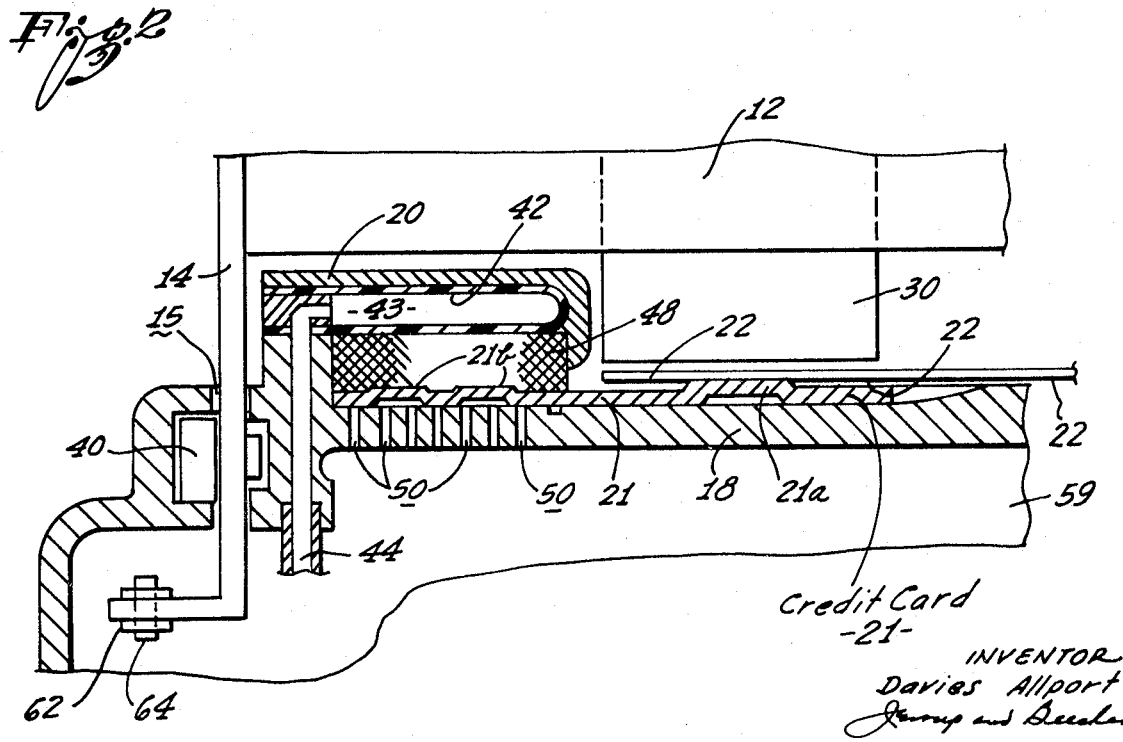
FIG. 2 is a sectional view taken essentially along the line 2—2 of FIG. 1.

The unit shown in FIGS. 1 and 2 includes a base 10 having a generally flat configuration. A carriage is mounted on the base 10 for movement across the base, and the carriage includes a handle 12 and side brackets 14 and 16. The side brackets move in guideways 15, 17 in the base 10, as the handle is moved across the base. An apertured base plate 18 is revealed through an opening in the base 10, and a housing 20 is mounted on the base over the apertured base plate.

The credit card 21 to be checked, for example, is placed on the base plate 18 under the housing 20. Then, an invoice 22 may be placed over the credit card 21. A series of print wheels 24 also extend through an opening on the base 10, and these print wheels may be set to the charges involved by the transaction, by corresponding settings of a series of linear controls 26. A visual readout 28 may be provided adjacent the controls 26, so as to provide a visual indication of the settings of the print wheels 24. A pair of pressure rollers 30 are rotatably mounted under the handle 12, and these rollers are controlled, for example, by means of an eccentric crank 38.

The unit thus far described is known to the art, and its function is such that as the handle 12 is moved across the base from the right to the left in FIG. 1, it passes freely over the invoice 22. However, when the handle reaches its left-hand position, a pin 34 which extends up through the base engages the crank 38 to turn the crank to an operative position as the crank is moved passed the pin 34. The resulting angular movement of the crank causes the pressure rollers 30 to move down against the invoice 22, so that on the return stroke of the handle 12, the invoice is pressed down on the credit card 21 and print wheels 24. The data on the card and indicia on the print wheels is now printed on the invoice 22 by means, for example, of an interposed carbon paper.

As shown in FIG. 2, for example, the side bracket 14 is supported in the guideway 15 on a pair of rollers, such as the roller 40, and as shown in FIG. 1, the side bracket 16 is supported by a similar pair of rollers 41 in the guideway 17. The crank 38 is shown on the external surface of the side bracket 16 in FIG. 1 in order to clarify the description of these elements. However, the elements would normally be mounted in an inaccessible part of the equipment.

A diaphragm 42 is supported under the housing 20 form an expansible chamber 43. Pressurized fluid is fed into the chamber 43 through a conduit 44. As mentioned above, a credit card, such as the credit card 21 is slipped under the housing 20 when the apparatus is to be operated, and the invoice 22 is placed partially over the credit card. A resilient backup pad 48 is mounted in the housing 20 under the expansible chamber 43. When pressurized fluid is introduced into the chamber 43, the resilient backup pad is forced down against the credit card holding it firmly against the apertured base plate 18.

The credit card has a first set of embossments 21a which are disposed under the invoice 22, and which serve to impart certain information to the invoice, such as the name of the card holder, the address, and so on. The information represented by the embossments 21a is imprinted on the invoice 22, when the pressure roller 30 is moved down against the invoice during the return stroke of the handle 12, as described above.

The base plate 18 has a series of apertures 50 formed in it and which are disposed under the housing 20. The credit card has further embossments 21b which may be referred to as identifying indicia, and these latter embossments, as shown in FIG. 2, provide intercoupling channels between the apertures 50 in the base plate 18, when the credit card is in place under the housing 20. It will be appreciated that when the pressurized fluid is introduced through the conduit 44 into the chamber 43 the resilient backup pad 48 is forced down against the face of the credit card 21, so that the identifying embossments 21b on the card are firmly held in position on the base 10 with respect to the apertures 50 in the base. Then, when a pressurized fluid, such as air, is introduced through certain of the apertures 50, a conduit will be completed for the pressurized fluid to selected others of the apertures 50, depending upon the configuration of the embossments 21b.

As mentioned above, one of the features of the present invention is the provision of an automatic date-verifying apparatus which relieves sales personnel from the requirement of checking credit cards as to expiration dates. For this purpose, the credit card is provided with a special embossment representing the year of expiration and another embossment representing the month of that year. These embossments may be sensed by the apertures 50 under the housing 20 in FIGS. 1 and 2, together with other embossments representative of, for example, the serial number of the card.

Figure 3:
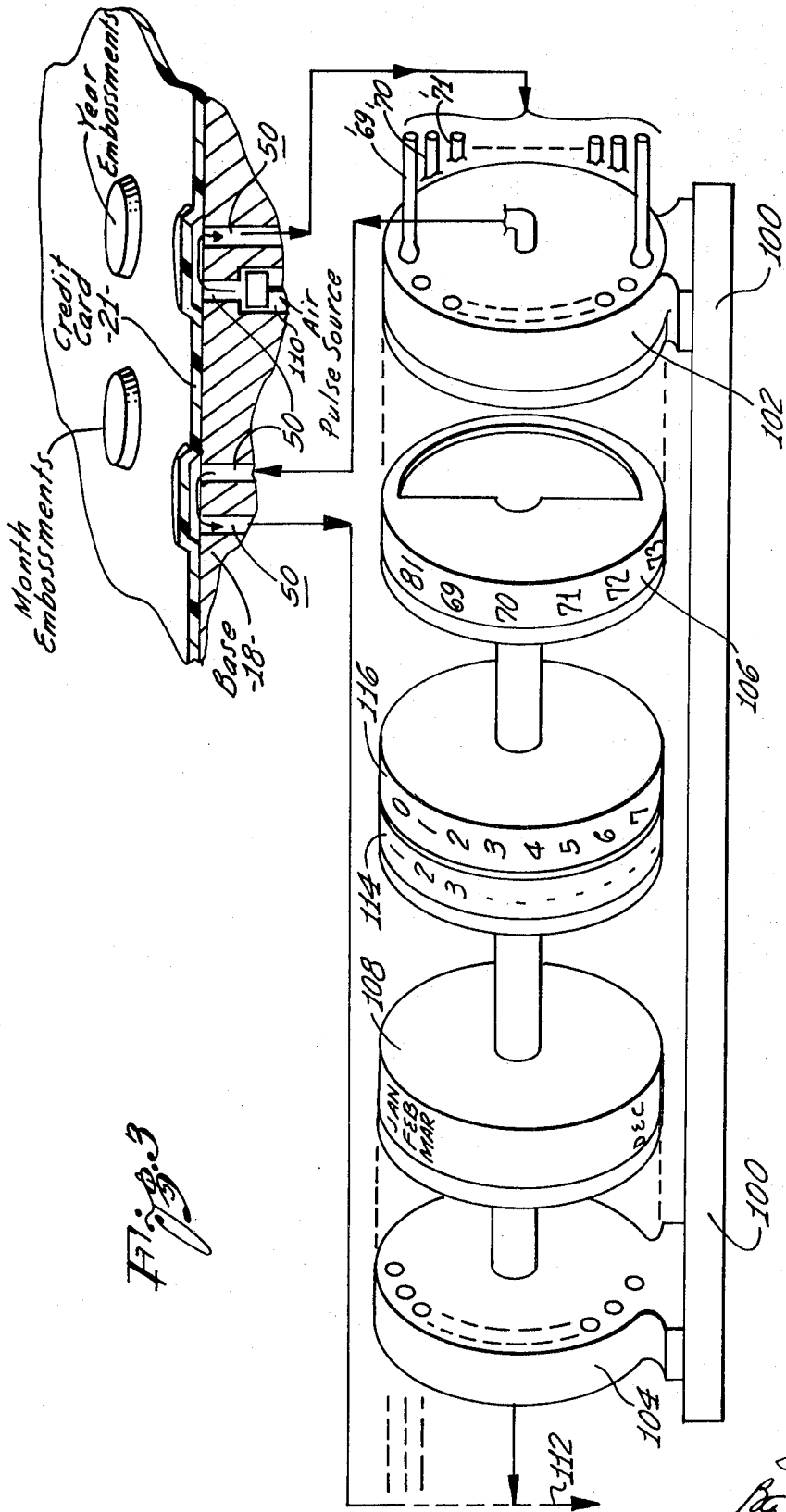
FIG. 3 is a perspective exploded representation of a pneumatic mechanism for sensing the expiration date of a card, such as the card placed in the imprinter mechanism of FIGS. 1 and 2.

Certain of the aforesaid apertures 50 are shown, for example, in FIG. 3. It will be assumed for purposes of the present description, for example, that 12 separate embossments corresponding to 12 separate pairs of apertures 50 are provided to designate the months, so that a channel is provided for a particular month, only when an embossment on the card bridges the corresponding pair of apertures 50. In like manner, a further series of pairs of apertures 50 may be used to designate the year, and any desired number of such pairs may be used. Then, a channel is provided from one aperture to the other of any pair, only when the card carries an embossment corresponding to that year.

The expiration date checker shown in FIG. 3 may be mounted adjacent the imprinter of FIGS. 1 and 2 and may, for example, include a base 100 having discs 102 and 104 mounted in coaxial relationship at the opposite ends thereof. In addition, a pair of wheel discs 106 and 108 are rotatably mounted in coaxial relationship with the discs 102 and 104, the disc 106 being mounted adjacent the disc 102 and rotatable with respect thereto from one angular position to another, and the disc 108 being mounted adjacent the disc 104 and being rotatable with respect thereto independently of the disc 106 from one angular position to another. With such an assembly, the disc 106, for example, is rotated to a particular year setting corresponding to the current year, for example, and the disc 108 is rotated to a particular month setting corresponding to the particular month.

When the wheel or disc 106 is turned, for example, to the current year, a depression in its face intercouples a group of input apertures in the disc 102 to a central output aperture in the disc. The central output aperture is connected to one of each pair of apertures 50 corresponding to the month embossments, whereas the input apertures in the disc 102 are connected to different ones of the apertures 50 corresponding to the year embossments. The other apertures 50 of the pairs corresponding to the year embossments are all coupled to an appropriate air pulse source 110.

If a particular card being processed terminates in 1969, it will have an embossment intercoupling the pair of apertures 50 corresponding to 1969, so that an airpath will be established from the air pulse source 110 through the corresponding input aperture in the disc 102 to its interior. The wheel 106 is turned to "1969" and, in that angular position, its internal depression couples the 1969 input aperture, and all preceding year input apertures to the central output aperture and back to all of the apertures 50 corresponding to one aperture of each pair associated with the month embossments.

All the other pairs of the month embossments are respectively coupled to the disc 104. Then, should the card expire in the current month of the current year, a month embossment of that month would provide a continuous path to the disc 104 and through the corresponding input aperture in that disc to its interior. The wheel 108 has a depression which couples the input apertures of the disc 104 to its central output apertures. When the wheel is set to any month, the input aperture corresponding to that month and all previous months are coupled to the output aperture. In this way, should the wheel 108 be set to the current month, a path would be established to the output conduit 112 which would then extend to the output of the system of FIG. 3 designating that the card has expired and should be rejected.

Similar wheels 114 and 116 may be provided which are coupled in the same manner in series with the month and year wheels, so that days also may be established in the pneumatic circuit, if so desired. The wheels 106, 108, 114, 116 serve as disc-shaped manifolds, and they may additionally serve as print out wheels.

In the system of FIG. 4, the card validity reader of FIGS. 1 and 2 is represented by a block 150, and the card expiration date reader of FIG. 3 is represented by a block 152. When a pulse from the source 110 is passed through the validity reader 150, corresponding fluidic pulses are introduced into the conduits between the block 150 and a group of pneumatically operated electric switches represented by the block 154, to set the various switches in the group represented by the block 154 in a pattern corresponding to the code pattern of the embossments on the card being processed by the reader which, in turn, represents the serial number of the reader.

At the same time, an air pulse appears in the conduit 112 at the output of the card reader represented by the block 152 if the particular card has expired. Should that be the case, a pneumatically operated electric switch represented by the block 156 is operated which completes a circuit through an OR-gate 158 to activate a reject circuit represented by the block 160 which in turn introduces a reject signal to appropriate lamp indicator logic represented by the block 162 causing the red indicator lamp, for example, to glow. On the other hand, if the card has not expired, the pneumatically operated switch 156 will not be closed, and no reject signal will be applied from that switch to the reject circuit 160 or to the lamp indicator logic 162.

The serial number of the card being processed appears by the configuration of the pneumatically operated electric switches represented by the block 154, and this configuration is compared in a comparator circuit 164 with the setting of a serial/parallel register 166. The register 166 is set successively in accordance with serial numbers recorded on a tape loop recorder 168, and representative, for example, of credit card serial numbers which, for one reason or another are invalid. The numbers recorded on the tape loop recorder 168 are in the same code as the code represented by the actuation of the switches of the block 154. The resulting signals of each group are sensed and amplified in an amplifier 170, and used to set the register 166 to a corresponding setting.

To initiate the operation, a push button switch 172 is depressed, which actuates a control circuit 174. The control circuit 174 serves to move the tape loop in the tape recorder 168 such that the next word on the loop is sensed, amplified by the amplifier 170 and used to set the serial/parallel register 166. The setting of the register 166 is then compared with the setting of the switches in the block 154 in the comparator 164, and if a match is made, an appropriate signal is applied to the reject circuit 160 which causes the reject signal to be applied to the lamp indicator logic 162 to illuminate the red lamp.

When that occurs, a reset signal is generated by the reject circuit which resets the serial/parallel register 166 to zero, and which also resets the switches of the block 154 to their original "zero" setting, and which also serves to reset a word counter 178. However, if no match is made, an end of word (EOW) signal is sensed by the control circuit 174, and after a predetermined time, the control circuit moves the tape recorder through the next word. The procedure is then repeated. As each word is scanned, the EOW signal is applied to the word counter 178 to step the word counter from one count to the next. When the counter reaches a predetermined count, corresponding to all the invalid numbers recorded on the tape recorder 168, and if no match was made between the number on the card being processed any any of the invalid numbers, a signal is applied from the word counter to the lamp indicator logic 162 which energizes the green lamp to designate that the card is acceptable.

During the scanning process, the control circuit 174 introduces a signal to the lamp indicator logic 162 to cause an amber lamp to be energized. Whenever the reject circuit 160 develops an output, indicating a reject situation, a stop signal is applied to the control circuit 174 through an OR-gate 186 to stop all further movement of the tape recorder 168, and the aforesaid reset signals are applied to the various components 154, 166 and 178. Likewise, when the scanning has been completed and a card is indicated as acceptable, the word counter 178 generates a stop signal which is applied to the control circuit 174 through the OR-gate 186, and it also generates a reset signal which also serves to reset the various components. The reset signals from the reject circuit 160 or from the word counter are applied to the components to be reset through respective OR-gates 180, 182 and 184.

It will be appreciated that the tape loop recorder 168 and its associated components may be located adjacent the units of FIGS. 1-3 at the point of use of the card. Conversely, however, the tape loop recorder and its various components may be located at a central station, and signals from the various points of use may be sent to the central station by any appropriate telemetry system for comparison with the signals recorded in the tape loop recorder.

It will also be appreciated that the various circuits which make up the blocks shown in FIG. 4 are in themselves well known to the art, so that a detailed description of the circuitry is not necessary for a clear understanding of the present invention or for a full description of the system.

It will be appreciated that although the description of the system and apparatus of the present invention has been directed to the processing of credit cards, it may equally be used for processing other types of cards or media in general for data processing purposes. For example, the unit may be used for inventory control, whereby the data members described above would identify part numbers. Other control functions may also be served by the unit.

What is claimed is:

1. Apparatus for sensing data indicia on a medium, such as a credit card and the like, said data indicia appearing as embossments on the medium, said apparatus including: a base constructed to support the medium, said base having apertures therein selectively intercoupled by the embossments on the medium; input means for introducing a pressurized fluid through a first group of said apertures; utilization means for sensing pressurized fluid output signals for sensing pressurized fluid output signals passed through a second group of said apertures selectively intercoupled to said first group, date expiration means interposed between said input means and said utilization means for controlling the passage of said pressurized fluid output signals to said utilization means in accordance with an established expiration date represented by further embossments on said medium, in which said date expiration means includes a first disc-shaped manifold for receiving said pressurized fluid output signals representative of the aforesaid expiration date, and a second disc-shaped rotatable member coaxially mounted adjacent said manifold and rotatable to predetermined settings to provide an output fluid signal to said utilization means indicative of whether or not the expiration date has been exceeded.

2. Apparatus for sensing data indicia on a medium, such as a credit card and the like, said data indicia appearing as embossments on the medium, said apparatus including: a base constructed to support the medium, said base having apertures therein selectively intercoupled by the embossments on the medium; input means for introducing a pressurized fluid through a first group of said apertures; utilization means for sensing pressurized fluid output signals for sensing pressurized fluid output signals passed through a second group of said apertures selectively intercoupled to said first group, date expiration means interposed between said input means and said utilization means for controlling the passage of said pressurized fluid output signals to said utilization means in accordance with an established expiration date represented by further embossments on said medium, in which date expiration means includes first and second manifolds respectively representative of months and year, first and second adjustable members respectively positioned adjacent said first and second manifolds and independently adjustable relative thereto to establish a year and month expiration date in correspondence with the aforesaid embossments on said medium, and conduit means intercoupling said first and second manifolds in serial relationship between said input means and said utilization means.

3. Apparatus for sensing data indicia on a medium, such as a credit card and the like, said data indicia appearing as embossments on the medium, said apparatus including: a base constructed to support the medium, said base having apertures therein selectively intercoupled by the embossments on the medium, input means for introducing a pressurized fluid through said first group of apertures; utilization means for sensing pressurized fluid output signals passed through a second group of said apertures selectively intercoupled to said first group, and which includes adjustable control means interposed between said input means and said utilization means for controlling the passage of said pressurized fluid output signals to said utilization means, said control means including a manifold having input apertures and an output aperture, conduit means coupling said input means to said input apertures of said manifold, an adjustable member for selectively coupling said input apertures of said manifold to said output aperture, and further conduit means coupling said output aperture to said utilization means.

4. The apparatus defined in claim 1 in which disc-shaped rotatable member additionally functions as a printout wheel.

* * * * *